(12) United States Patent
Criel

(10) Patent No.: US 9,657,638 B2
(45) Date of Patent: May 23, 2017

(54) METHOD FOR RELEASING THE PRESSURE IN A FUEL SYSTEM IN A CRASH

(71) Applicant: INERGY AUTOMOTIVE SYSTEMS RESEARCH (Societe Anonyme), Brussels (BE)

(72) Inventor: Bjorn Criel, Sint-Martens-Lennik (BE)

(73) Assignee: INERGY AUTOMOTIVE SYSTEMS RESEARCH (SOCIÉTÉ ANONYME), Brussels (BE)

(*) Notice: Subject to any disclaimer, the term of this patent is extended or adjusted under 35 U.S.C. 154(b) by 136 days.

(21) Appl. No.: 14/410,685

(22) PCT Filed: Jun. 26, 2013

(86) PCT No.: PCT/EP2013/063332
§ 371 (c)(1),
(2) Date: Dec. 23, 2014

(87) PCT Pub. No.: WO2014/001369
PCT Pub. Date: Jan. 3, 2014

(65) Prior Publication Data
US 2015/0192064 A1    Jul. 9, 2015

(30) Foreign Application Priority Data
Jun. 26, 2012 (EP) .................................. 12173649

(51) Int. Cl.
| F02B 77/08 | (2006.01) |
| B60K 15/035 | (2006.01) |
| B60R 21/0136 | (2006.01) |
| B60K 28/14 | (2006.01) |
| B60K 1/04 | (2006.01) |
| B60R 21/01 | (2006.01) |

(52) U.S. Cl.
CPC .......... *F02B 77/082* (2013.01); *B60K 15/035* (2013.01); *B60K 15/03519* (2013.01);
(Continued)

(58) Field of Classification Search
CPC .......... F02M 25/0836; F02M 25/0818; F02M 65/006; F02M 25/0827; F02D 41/0032;
(Continued)

(56) References Cited

U.S. PATENT DOCUMENTS

| 5,441,026 A * | 8/1995 | Akimoto ............... F02D 33/006 123/198 D |
| 6,223,714 B1 | 5/2001 | Anderson et al. |

(Continued)

FOREIGN PATENT DOCUMENTS

| DE | 198 44 215 | 4/2000 |
| DE | 10 2009 009 9 | 8/2010 |

OTHER PUBLICATIONS

International Search Report Issued Aug. 14, 2013 in PCT/EP13/063332 Filed Jun. 26, 2013.

*Primary Examiner* — Long T Tran
(74) *Attorney, Agent, or Firm* — Oblon, McClelland, Maier & Neustadt, L.L.P.

(57) ABSTRACT

A method for controlling depressurization of a fuel system mounted on board of a vehicle including a vehicle impact sensor, the method including: detecting, using the vehicle impact sensor, whether an impact on the vehicle is present; and when the impact on the vehicle is detected, using a controller for generating at least one signal for controlling an opening of at least one valve disposed in the fuel system, to release internal pressure of the fuel system.

21 Claims, 1 Drawing Sheet

(52) U.S. Cl.
CPC .......... *B60K 28/14* (2013.01); *B60R 21/0136* (2013.01); *B60K 2001/0438* (2013.01); *B60R 2021/01252* (2013.01); *B60Y 2306/01* (2013.01)

(58) Field of Classification Search
CPC ............. F02D 41/004; F02D 2041/225; F02D 41/0045; F02D 41/22; F02D 41/005; F02D 19/0623; F02D 19/022; F02D 19/025; F02D 19/0605; F02D 19/0621; F02D 2041/223; F02D 2041/228; F02D 2200/0602; F02D 2200/501
USPC ..... 123/529, 339.15, 359, 394, 406.13, 690, 123/479, 630, 198 D
See application file for complete search history.

(56) References Cited

U.S. PATENT DOCUMENTS

| | | | | |
|---|---|---|---|---|
| 6,302,144 B1* | 10/2001 | Graham | ................ | B60K 15/03 123/509 |
| 6,761,154 B2* | 7/2004 | Takagi | ............... | F02M 25/0818 123/198 D |
| 7,107,971 B2* | 9/2006 | Spink | ............... | B60K 15/03519 123/518 |
| 7,277,253 B2* | 10/2007 | Yamashita | ............... | G11B 5/54 360/75 |
| 7,377,253 B2* | 5/2008 | Washeleski | ....... | B60K 15/03504 123/198 D |
| 2004/0194831 A1* | 10/2004 | Balsdon | ........... | B60K 15/03504 137/587 |
| 2006/0225709 A1* | 10/2006 | Washeleski | ....... | B60K 15/03504 123/478 |
| 2007/0095392 A1* | 5/2007 | Billings | .................... | F16K 3/24 137/39 |
| 2009/0063027 A1* | 3/2009 | Grant | .................... | B60K 28/14 701/112 |
| 2009/0187327 A1* | 7/2009 | Grant | .................. | F02D 41/3082 701/103 |
| 2010/0140518 A1* | 6/2010 | Billings | .................... | F16K 3/24 251/129.01 |
| 2010/0307462 A1* | 12/2010 | Peters | ................ | F02M 25/0872 123/520 |
| 2012/0130596 A1 | 5/2012 | Ooiwa | | |

\* cited by examiner

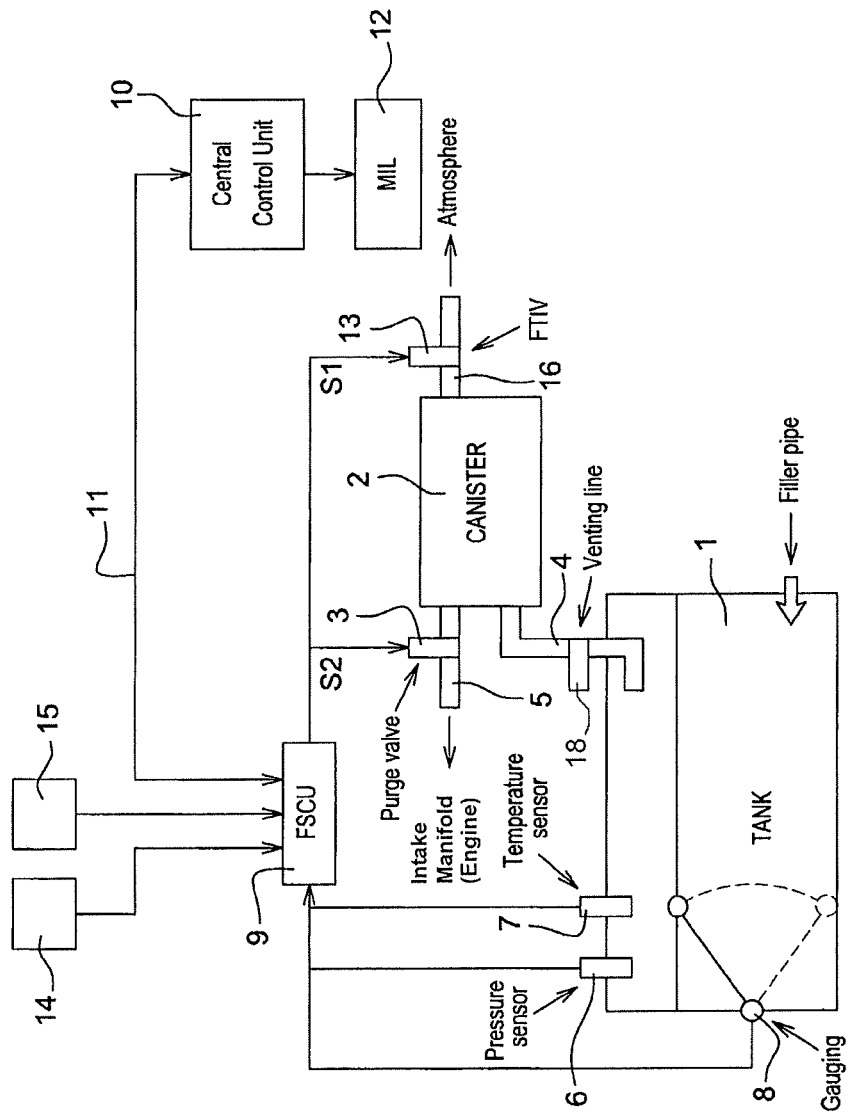

METHOD FOR RELEASING THE PRESSURE IN A FUEL SYSTEM IN A CRASH

The present invention relates generally to fuel systems installed in motor vehicles. In particular, the invention relates to a method for relieving the pressure in a fuel system, in the case where the vehicle is involved in a crash or the like.

In general, a fuel system integrates a fuel tank and among other components, a fuel pump (which draws fuel from the fuel tank and discharges fuel from the fuel tank through an opening in the fuel tank wall), a fuel vapour canister (through which any air or fuel vapour received into or discharged out of the fuel tank travels), one or several valves (communicating with the fuel vapour canister) or any other fuel system component.

During a vehicle crash, there is risk of addition of oxygen to the fuel tank and the fuel pump environment. The addition of oxygen to the pump environment may cause an explosion if the pump continues to operate after the crash. Several solutions have been proposed to turn off the pump in case of a crash.

Another potential problem during a crash is a fire starting near to the fuel system that is pressurized with fuel. Such fire could lead to an explosion.

Even though the occurrence of such a crash situation leading to such an explosion is rare, nevertheless, it is an object of the present invention to provide a method that improves the safety of a vehicle in case of an accident.

To achieve the aforementioned and other objects, the present invention provides a method for controlling the depressurization of a fuel system mounted on board of a vehicle equipped with a vehicle impact sensor, wherein the method comprising the steps of:
  detecting, using the vehicle impact sensor, whether an impact on the vehicle is present; and
  when the impact on the vehicle is detected, using a controller for generating at least one signal for controlling the opening of at least one valve disposed in the fuel system, so as to release the internal pressure of the fuel system.

The advantage of the method according to the invention resides in the fact that the pressure within the fuel system is automatically relieved when an impact occurs on the vehicle (for example, at the time of a crash or the like). As a result, the risk of an explosion and/or the damages caused by a potential explosion can be minimized.

It is called impact sensor, a sensor that is able to detect a crash of the vehicle or the like.

The signal(s) generated by the controller of the invention can be a PWM (Pulse Width Modulated) type signal.

Depressurization means the fact to balance the internal fuel system pressure with the ambient pressure.

In a particular embodiment, the fuel system comprises a fuel tank connected in a communicating manner to a canister. Advantageously, the controller of the invention generates a first signal for controlling the opening of a fuel tank isolation valve (FTIV), so as to allow fuel vapours within the fuel tank to flow towards the canister to be surely captured.

In a first particular embodiment, the fuel tank isolation valve (FTIV) is disposed in a first venting line through which the canister can communicate with the atmosphere.

This first embodiment is advantageous in that leak detection is still possible for the fuel system as a whole: the position of the fuel tank isolation valve is such that the measured internal tank pressure inside the complete fuel system can be monitored for the carrying out of leak detection methods in the exact same conditions as in a fuel system without any fuel tank isolation valve in the venting line through which the canister can communicate with the atmosphere.

Such leak detection methods can be compulsory to ensure integrity of the fuel system and compliance with volatile fuel vapour emission regulation.

Most prior art techniques for detecting an absence of leak in a fuel system utilize measurements of pressure internal to the fuel system. For example, in a known detection technique, it is proposed to apply a vacuum to the inner volume of the entire fuel system. Once a vacuum is created, the system is closed and it is checked for a leak by observing the rate at which the vacuum decays. In a conventional internal combustion vehicle, vacuum from the engine intake manifold can be used to help create the vacuum.

In a second particular embodiment, the fuel tank isolation valve (FTIV) is disposed in a second venting line through which the fuel tank can communicate with the canister.

In a particular embodiment, the fuel system comprises an intake manifold connected in a communicating manner to the canister. Advantageously, the controller of the invention generates a second signal for controlling the opening of a purge valve, so as to allow fuel vapours stored in the canister to flow towards the intake manifold to be surely burned.

Advantageously, the controller of the invention generates a third signal for controlling the opening of an additional valve disposed in a third venting line through which the fuel tank can communicate with the canister.

Advantageously, each of the valves controlled by the controller according to the invention is an electromagnetic valve.

In an advantageous embodiment, the impact sensor is an airbag crash sensor.

In another embodiment, multiple crash sensors may be used to provide inputs to the controller according to the invention. If variable output sensors (measuring the severity of a crash) are available, they may be used to provide varying degrees of response.

In an advantageous embodiment, the controller of the invention generates the valve control signal(s) based on data obtained by means of at least one other sensor mounted on board of the vehicle.

Among fuel system sensors there are generally a fuel level sensor, a temperature sensor, a pressure sensor, a hydrocarbon vapour sensor, one or several on-board-diagnostic (OBD) sensors. Other types of sensors can be part of this list.

In a particular embodiment, the controller according to the invention is adapted to analyse data measured by, for example, temperature and pressure sensors disposed in the fuel tank environment. Based on the results of this analysis, the controller can, for example, generate a control signal for each of the FTIV and purge valves. In an advantageous embodiment, each signal may contain, for example, information about the opening instant and the opening duration of the valve. In a first example, after analysing temperature and pressure data, the controller according to the invention may decide to activate (i.e. open) the FTIV valve only. In a second example, after analysing temperature and pressure data, the controller may decide to activate (i.e. open) at a first time the FTIV valve, and at a second later time the purge valve. Thus, the controller according to the invention can decide whether to activate the valves at the same time or at different times. More generally, the controller according to the invention is adapted to determine a sequence of activation of the valves as a function of operating and environmental conditions of the fuel system.

In a first advantageous embodiment, the controller according to the invention is comprised in a Fuel System Control Unit (FSCU) already present on board the vehicle.

In a particular embodiment, the FSCU communicates with an engine control unit (ECU) and/or impact sensor(s) through an appropriate data communication network, such as CAN or LIN.

Cost is reduced by using an existing processing unit within a controlled fuel system (i.e. comprising a FSCU and data network connection), and eliminating the need for other components.

One result is that configurability is increased through the ability to change algorithms in the FSCU relating to the control of one or a plurality of valve(s) during a collision event. This allows for the same hardware to be used in many different vehicle environments.

Crash information may be transmitted to the FSCU over a data network either from the ECU (or any other control unit) or directly from impact sensors through other communication means.

Impact sensors may provide the severity of a vehicle collision or other similar event. In that circumstance the controller according to the invention can control the valve(s) (FTIV, purge valve, . . . ) for releasing the pressure within the fuel system.

In a second advantageous embodiment, the controller according to the invention is comprised in the engine control unit (ECU).

In a particular embodiment, the vehicle is a (plug-in) hybrid vehicle.

Another embodiment of the present invention further relates to a fuel system of a vehicle comprising a controller as described above.

In another embodiment, the invention further relates to a computer-readable storage means storing a computer program for use in a fuel system as described above and containing a set of instructions executable by a computer for implementing the method for controlling the depressurization of a fuel system as described above (in any one of its different embodiments).

The invention further relates to a vehicle comprising a fuel system as described above.

FIG. 1 illustrates the subject matter of the invention but is not to be construed as limiting its scope.

FIG. 1 illustrates a fuel system according to a particular embodiment of the invention. The fuel system is mounted on board of a vehicle. The fuel system comprises a fuel tank 1 that is in communication with a charcoal canister 2 via a venting line 4. The charcoal canister 2 has another venting line 5 connected to the intake manifold of the internal combustion engine. A purge valve 3 is disposed in the venting line 5 to allow for selective communication between the charcoal canister 2 and the intake manifold. There is an additional communication between the charcoal canister 2 and the atmosphere. This communication can be selectively controlled via a fuel tank isolation valve or FTIV 13 to create a completely sealed fuel system.

In the example illustrated on FIG. 1, the FTIV 13 is disposed in the venting line 16. When the FTIV 13 is opened, it allows the charcoal canister 2 to communicate with the atmosphere, and it allows fuel vapours within the fuel tank to flow towards the charcoal canister 2 to be surely captured. In another example (not illustrated), the FTIV 13 can be disposed in the venting line 4, and the venting line 16 can be left open.

In a preferred embodiment of the invention, the purge valve 3 and the FTIV valve 13 are both opened when the internal combustion engine is operated and allows for a canister purging mode. The purge valve 3 is closed and the FTIV valve 13 is opened when the vehicle is being refueled by the addition of gasoline to the fuel tank 1. The purge valve 3 and the FTIV valve 13 are both closed when the internal combustion engine is operated and the canister is not purged, or when the engine is not operated (vehicle parked). Further, in the case of a hybrid vehicle, the purge valve 3 and the FTIV valve 13 are both closed when the vehicle is operated solely under battery power.

In a configuration where the FTIV 13 is disposed in the venting line 16, an additional valve 18 could be disposed in the venting line 4 for isolating the tank 1 from the canister 2 to avoid unwanted fuel vapour suction inside the air intake manifold during the canister purge mode.

The fuel system further comprises a pressure sensor 6 adapted for measuring the pressure inside the fuel tank 1. For example, the pressure sensor 6 is adapted to measure pressure comprised within a working range of pressure. For example this could be a range of −30 mbar to +30 mbar for the fuel system in a conventional internal combustion vehicle, or −150 mbar to +350 mbar in a plug-in hybrid vehicle.

The fuel system further comprises a temperature sensor 7 adapted for measuring the temperature inside the fuel tank 1. The fuel system further comprises a float-type fuel level sensor 8 adapted for measuring the fuel level inside the fuel tank 1. These sensors can be used for diagnostic purposes.

The present invention proposes a method which consists in using a controller for activating the depressurization of the fuel system in case of a detection of an impact or a crash of the vehicle. In the following of the description, it is described a particular embodiment where the controller according to the invention is comprised in the Fuel System Control Unit (FSCU) of the vehicle. In this particular embodiment, when a vehicle crash occurs, the FSCU controls the opening of the valve(s) of the fuel system, in order to release the internal pressure of the fuel system.

In another embodiment, the controller according to the invention can be comprised in the Central Control Unit (CCU) of the vehicle.

In yet another embodiment, the controller according to the invention can be comprised in a specific microprocessor which is distinct from the FSCU or the CCU.

Referring back to FIG. 1, a Fuel System Control Unit (FSCU) 9 is configured to execute an algorithm for releasing the pressure within the fuel system in case of a vehicle crash event. To this end, the FSCU 9 is capable of generating control signal(s) for opening the purge valve 3 and/or the FTIV valve 13. The FSCU 9 communicates with a Central Control Unit 10 (i.e. an engine control unit (ECU)) via of a communication bus 11.

The FSCU 9 can manage the operating conditions and functioning parameters of the fuel system. The FSCU generally:
- has means for controlling functions of the fuel system,
- is connected with at least one fuel system component to send signals or receive signals from said at least one fuel system component,
- is connected with at least one sensor that sends signals to the FSCU and/or the ECU,
- is adapted to electronically and bi-directionally communicate with the ECU.

The FSCU is a standalone controller, different from the ECU and which has taken over the control of the fuel system from the ECU, i.e. the ECU doesn't directly control the fuel system any longer. The FSCU communicates with the ECU also for indication of any fuel system failure to the ECU.

Reliability is increased by segmenting control of the fuel system away from the ECU, reducing load on the ECU.

The ECU 10 can activate a Malfunction Indicator Light (MIL) on the dashboard of the vehicle when operation problem is detected.

In the example illustrated in FIG. 1, an airbag crash sensor 14 and/or other crash sensors 15 exist to provide a signal when an impact or other similar event occurs. This signal is transmitted to the FSCU 9. Once received, the FSCU 9 generates a signal S1 for controlling the opening of the FTIV valve 13, and a signal S2 for controlling the opening of the purge valve 3. By this way, the pressure within the fuel system can be released and the risk of an explosion can be minimized.

In another example, the controller according to the invention can also generate a signal for controlling the opening of an additional valve 18 disposed in the venting line 4.

In another embodiment, the signal provided by the sensors 14 and 15 can be transmitted directly to the ECU 10. Then, the FSCU 9 reads this information via the data communication bus 11.

While the present invention has been described with reference to a limited number of embodiments, it is to be understood that the present invention is not limited to the disclosed embodiments or constructions. On the contrary, the present invention is intended to cover various modifications and equivalent arrangements.

The invention claimed is:

1. A method for controlling depressurization of a fuel system mounted on board of a vehicle, the vehicle including a fuel tank connected in a communicating manner to a canister, and a vehicle impact sensor, the method comprising:
   detecting, using the vehicle impact sensor, whether an impact on the vehicle is present; and
   once the impact on the vehicle is detected, opening a fuel tank isolation valve disposed in the fuel system, to release internal pressure of the fuel system;
   wherein a controller generates a first signal to control opening of the fuel tank isolation valve, to allow fuel vapors within the fuel tank to flow towards the canister; and
   wherein the fuel tank isolation valve is disposed in a first venting line through which the canister can communicate with the atmosphere.

2. The method according to claim 1, wherein the fuel system further includes an intake manifold connected in a communicating manner to the canister, and wherein the controller generates a second signal to control opening of a purge valve, to allow fuel vapors stored in the canister to flow towards the intake manifold.

3. The method according to claim 1, wherein the controller generates a third signal to control an opening of an additional valve disposed in a third venting line through which the fuel tank can communicate with the canister.

4. The method according to claim 1, wherein at least the fuel tank isolation valve is an electromagnetic valve.

5. The method according to claim 1, wherein the vehicle impact sensor is an airbag crash sensor.

6. The method according to claim 1, wherein the controller generates at least one of the at least one signal and the first signal based on data obtained by at least one other sensor mounted on board of the vehicle.

7. The method according to claim 1, wherein the controller is included in a Fuel System Control Unit.

8. The method according to claim 1, wherein the controller is included in a central control unit.

9. The method according to claim 1, wherein the vehicle is a hybrid vehicle or a plug-in hybrid vehicle.

10. A fuel system of a vehicle comprising:
    a fuel tank connected in a communicating manner to a canister;
    a fuel tank isolation valve and a first venting line through which the canister can communicate with the atmosphere;
    a controller configured to generate at least one signal to control an opening of the fuel tank isolation valve disposed in the fuel system, to release internal pressure of the fuel system when an impact on the vehicle is detected by a vehicle impact sensor;
    wherein once impact on the vehicle is detected, the controller is configured to open the fuel tank isolation valve by generating a first signal, to allow fuel vapors within the fuel tank to flow towards the canister; and
    wherein the fuel tank isolation valve is disposed in the first venting line through which the canister can communicate with the atmosphere.

11. The fuel system according to claim 10, further comprising an intake manifold connected in a communicating manner to the canister via a purge valve, and wherein the controller is configured to generate a second signal to control opening of the purge valve, to allow fuel vapors stored in the canister to flow towards the intake manifold.

12. The fuel system according to claim 10, further comprising a third venting line through which the fuel tank can communicate with the canister and an additional valve disposed in the third venting line, wherein the controller is configured to generate a third signal to control an opening of the additional valve.

13. The fuel system according to claim 10, wherein at least the fuel tank isolation valve is an electromagnetic valve.

14. The fuel system according to claim 10, wherein the controller is configured to generate at least one of the at least one signal and the first signal based on data obtained by at least one other sensor mounted on board the vehicle.

15. The fuel system according to claim 10, further comprising a fuel system control unit including the controller.

16. A non-transitory computer-readable storage medium storing a computer program for use in a fuel system, and including a set of computer executable instructions executable by a computer to implement the method according to claim 1.

17. A vehicle comprising a fuel system comprising:
    a fuel tank connected in a communicating manner to a canister;
    a vehicle impact sensor;
    wherein the fuel system is according to claim 10.

18. The vehicle according to claim 17, wherein the vehicle impact sensor is an airbag crash sensor.

19. The vehicle according to claim 17, wherein at least the fuel tank isolation valve is an electromagnetic valve.

20. The vehicle according to claim 17, wherein the controller is included in a central control unit of the vehicle.

21. The vehicle according to claim 17, wherein the vehicle is a hybrid vehicle or a plug-in hybrid vehicle.

* * * * *